(12) United States Patent
Chen et al.

(10) Patent No.: US 9,441,331 B2
(45) Date of Patent: Sep. 13, 2016

(54) STACKED CITY ROAD

(71) Applicants: Qingwei Chen, Chengdu (CN); Shuang Chen, Chengdu (CN); Yujun Chen, Chengdu (CN); Yuyan Chen, Chengdu (CN)

(72) Inventors: Qingwei Chen, Chengdu (CN); Shuang Chen, Chengdu (CN); Yujun Chen, Chengdu (CN); Yuyan Chen, Chengdu (CN)

( * ) Notice: Subject to any disclaimer, the term of this patent is extended or adjusted under 35 U.S.C. 154(b) by 65 days.

(21) Appl. No.: 14/369,171

(22) PCT Filed: Dec. 21, 2012

(86) PCT No.: PCT/CN2012/087121
§ 371 (c)(1),
(2) Date: Jun. 26, 2014

(87) PCT Pub. No.: WO2013/097646
PCT Pub. Date: Jul. 4, 2013

(65) Prior Publication Data
US 2014/0377000 A1    Dec. 25, 2014

(30) Foreign Application Priority Data
Dec. 28, 2011    (BN) .......................... 201110445495.5

(51) Int. Cl.
*E01C 1/00*    (2006.01)
*E01C 1/04*    (2006.01)
*E01C 1/02*    (2006.01)
*E04H 6/08*    (2006.01)

(52) U.S. Cl.
CPC ................ *E01C 1/002* (2013.01); *E01C 1/02* (2013.01); *E01C 1/04* (2013.01); *E04H 6/08* (2013.01)

(58) Field of Classification Search
CPC ............ E01C 1/04; E01C 1/002; E01C 1/02; E01C 1/00; E04H 6/08
USPC ................................................. 404/1; 52/175
See application file for complete search history.

(56) References Cited

U.S. PATENT DOCUMENTS

| | | | | |
|---|---|---|---|---|
| 1,784,728 | A * | 12/1930 | Harriss ..................... | E01C 1/04 104/124 |
| 5,846,020 | A * | 12/1998 | McKeown ............. | E01C 1/002 14/2.4 |
| 2009/0317184 | A1* | 12/2009 | Troster ..................... | E01D 1/00 404/1 |
| 2010/0104360 | A1* | 4/2010 | Sing ........................ | E01C 1/002 404/1 |
| 2012/0315084 | A1* | 12/2012 | Makarov .................. | E01C 1/04 404/1 |
| 2014/0205376 | A1* | 7/2014 | Derenoncourt ........... | E01C 1/02 404/1 |

* cited by examiner

*Primary Examiner* — Abigail A Risic
(74) *Attorney, Agent, or Firm* — Brundidge & Stanger, P.C.

(57) ABSTRACT

A three-dimensional urban road system capable of intensively utilizing land and avoiding traffic jam, including a straight section, a longitudinal slope section and an intersection. The straight section and the intersection are connected to form a road network. The longitudinal slope section is connected with the straight section, realizing connection between the straight section and the ground. The straight section includes a bottom road, a parking layer and a running layer; parallel ramps for small cars only arranged such that small cars in the straight section can switch among the three layers. Roads are changed into three layers: the upper running layer for small cars; the middle parking layer, a transfer layer for parking and connecting the ground road and the upper running layer; and the bottom road for large vehicles. Large vehicles and small cars are completely shunted, thus effectively solving the problem of traffic jam.

15 Claims, 10 Drawing Sheets

STACKED CITY ROAD

BACKGROUND OF THE INVENTION

1. Technical Field

The invention relates to a three-dimensional urban road, specifically to a three-dimensional urban road system capable of intensively utilizing land and avoiding traffic jam.

2. Description of Related Art

Three-dimensional main urban roads can solve problems of traffic jam, parking difficulty and serious inefficiency of the public traffic road resources in large and middle-sized cities, save and intensively utilize land in the urban construction, and also provide an important "space" guarantee to development of the car industry.

Traffic jam and parking difficulty bother large and middle-sized cities all around the world for a long time. It is a commonplace on various media. Large and middle-sized cities with flourishing economy and culture usually face more challenging traffic problems. In particular, many large and middle-sized cities in the world have issued various measures for "forbidding to run" or "limiting in running" because of the traffic jam in recent ten years, aiming at reducing the traffic flow, relieving the traffic pressure on roads and getting smooth roads.

As everyone knows, to disperse the traffic flow, overpasses are built at cross roads in the cities this is because overlarge traffic flow causes jams at many cross roads. Then, overpasses appeared at all major cross roads in cities. Those almost connected but completely separated intercommunicating flyovers, overpasses or underpasses join roads in the cities together. In large cities, those close overpasses in neighbors are not connected to form a three-dimensional road system because they do not have the function of shunting the vehicles to the destinations. Due to limit in urban space, upward and downward ramps reaching the destinations are only imaginations, so those overpasses disperse and shunt motor cars at the cross roads and then have to "gather" those cars under the ground so as to let the motor cars reaching the destinations run away. Of course, interference with non-motor vehicles and pedestrians become a common thing. However, the rest motor cars and the newly added motor cars pass through this position (generally, there are traffic lights to delay your time and even let you stand in a queue reaching the overpass) and repeat the same mode at the next cross road. This is the common phenomenon of all existing urban traffic roads. The overpasses become the main means and common method to solve the problem of traffic jam in modern large and middle-sized cities, but facing the continuous increase of the traffic flow, they still fail to eradicate the traffic jam because the three-dimensional urban roads and the ground roads cannot run independently and also cannot be organically connected. Moreover, strong promotion of the development of the public transit has become the common cognition of the whole society for a long time, but the implementation faces various difficulties due to restraints of various factors in actual operation, in particular the restraints of the traffic roads in space resources. Therefore, improvement is necessary.

BRIEF SUMMARY OF THE INVENTION

The invention aims to solve the problem of traffic jam on roads with a large traffic flow and provides a three-dimensional urban road system capable of intensively utilizing land and avoiding traffic jam.

The realization of the invention is as follows: a three-dimensional urban road system capable of intensively utilizing land and avoiding traffic jam is provided, characterized by comprising a straight section, a longitudinal slope section and an intersection. The straight section and the intersection are connected to form a road network. The longitudinal slope section is connected with the straight section to realize connection between the straight section and the ground. The straight section comprises a bottom road, a parking layer and a running layer. The centre of the bottom road is provided with a 7 m-9 m wide green belt according to the road width and the actual demands. Opposite, parallel ramps on which small cars run up and down are arranged between the bottom road and the parking layer and between the parking layer and the running layer. The ramps land on the 7 m-9 m wide green belt in the centre of the bottom road such that small cars in the straight section switch from the bottom road to the parking layer and stop on the parking layer or continuously switch from the parking layer to the running layer and run thereon.

According to the three-dimensional urban road system capable of intensively utilizing land and avoiding traffic jam claimed by the invention, it is characterized in that: the intersection comprises a full intercommunicating and intersecting structure formed by a main road and a secondary road; the main road comprises a bottom road, a parking layer and a running layer, respectively communicating with the bottom road, the parking layer and the running layer in the straight section; the secondary road comprises a bottom road and a running layer, wherein the parking layer and the running layer of the main road and the running layer of the secondary road realize full intercommunication and intersection; the parking layer and the running layer of the main road are two separated one-way roads 105, 106, wherein the one-way roads 105, 106 corresponding to the running layer of the main road are connected through connecting roads 209, and the two connecting roads 209 form two symmetric semi-rings; the running layer in the main road is connected to the running layer of the secondary road through approach bridges 206, 207 to realize step-down connection, so that cars switch from the running layer of the main road to the running layer of the secondary road to make a turn; the running layer in the secondary road is connected with the running layer of the main road through the approach bridge such that cars switch from the running layer of the secondary road to the running layer of the main road, realizing mutual switch and turn between the running layer of the main road and the running layer of the secondary road.

According to the three-dimensional urban road system capable of intensively utilizing land and avoiding traffic jam claimed by the invention, it is characterized in that: the intersection comprises a full intercommunicating and intersecting structure formed by a main road and a secondary road; the main road comprises a bottom road, a parking layer and a running layer, respectively communicating with the bottom road, the parking layer and the running layer in the straight section; each secondary road comprises a bottom road and a running layer, wherein the parking layer and the running layer of the main road and the running layer of the secondary road realize full intercommunication and intersection; the parking layer and the running layer of the main road are two separated one-way roads 105, 106, wherein the one-way roads 105, 106 corresponding to the running layer of the main road are connected through connecting roads 209, and the two connecting roads 209 form two symmetric semi-rings; the running layer of the secondary road is two one-way roads 105, 106 connected in parallel; the running layer of the main road is connected with the running layer of the secondary road through approach bridges which are respectively located on two sides of the one-way roads 105, 106 of the main road, realizing mutual switch between the running layer of the main road and the running layer of the secondary road and forming a full intercommunicating and intersecting structure.

According to the three-dimensional urban road system capable of intensively utilizing land and avoiding traffic jam claimed by the invention, it is characterized in that: the intersection comprises a full intercommunicating and intersecting structure formed by a transverse main road and a vertical main road; the transverse main road and the vertical main road respectively comprise a bottom road 306, a parking layer 306 and a running layer; the bottom roads, the parking layers and the running layers of the transverse main road and the vertical main road are respectively connected with the bottom road, the parking layer and the running layer of the straight section; the parking layer of the transverse main road is connected through approach bridges; the approach bridges are respectively connected with two downward square hole approach roads of the transverse main road and the two upward approach roads of the vertical main road such that cars switch from the transverse main road to the vertical main road and run on the later; projections on the one-way roads of the running layer of the transverse main road are connected to form an arch bridge across the vertical main road; the one-way roads on the parking layer and the running layer of the transverse main road are respectively connected through connecting roads 309; and a connecting road 310 is located between the running layer of the transverse main road and the running layer of the vertical main road.

According to the three-dimensional urban road system capable of intensively utilizing land and avoiding traffic jam claimed by the invention, it is characterized in that: the intersection comprises a full intercommunicating structure formed by a transverse main road and a vertical main road; the transverse main road and the vertical main road respectively comprise a bottom road, a parking layer and a running layer, respectively connected with the bottom road, the parking layer and the running layer of the above straight section, the parking layer of the transverse main road that is connected with the straight section is terminated at the cross road; the parking layer and the running layer of the vertical main road and the running layer of the transverse main road realize full intercommunication and intersection; both the transverse main road and the vertical main road are two spaced one-way roads 105, 106, wherein the corresponding one-way roads 105, 106 of the running layer on the vertical main road are connected through connecting roads 309 which form two symmetric semi-rings; the corresponding one-way roads 105, 106 of the running layer on the vertical main road are also connected with the running layer of the transverse main road through approach roads 309 on two sides such that cars switch between the running layer of the vertical main road and the running layer of the transverse main road and make a turn, thus realizing a full intercommunicating and intersecting structure.

According to the three-dimensional urban road system capable of intensively utilizing land and avoiding traffic jam claimed by the invention, it is characterized in that: the intersection comprise an intersecting T road formed by a transverse road and a vertical road; the transverse road and the vertical road respectively comprise a bottom road, a parking layer and a running layer; the running layer of the vertical road is connected with an approach bridge through an approach road 406 and led to the parking layer of the transverse road through the approach bridge; the parking layer of the transverse road is connected with the running layer of the transverse road through another approach road; and the running layer of the transverse road is connected with the running layer of the vertical road through another approach bridge 408.

According to the three-dimensional urban road system capable of intensively utilizing land and avoiding traffic jam claimed by the invention, it is characterized in that: the intersection comprises an intersecting T road formed by a transverse road and a vertical road; the transverse road and the vertical road respectively comprise a bottom road, a parking layer and a running layer; the running layer of the vertical road is downward connected with an approach bridge through an approach road on the outside and led to the parking layer of the transverse road through the approach bridge; the parking layer of the transverse road is upward connected with the running layer of the transverse road through another approach road on the outside; the running layer of the transverse road is downward connected to the parking layers of the transverse main road and the vertical main road through another approach road on the inner side; the parking layer of the vertical road is upward connected with the running layer of the vertical road through a third approach road.

According to the three-dimensional urban road system capable of intensively utilizing land and avoiding traffic jam claimed by the invention, it is characterized in that: the intersection comprises a four-direction straight intersecting structure by a main road and a secondary road; the main road comprises a bottom road, a parking layer and a running layer; the secondary road comprises a bottom road and a running layer, wherein the parking layer of the main road intercommunicate and intersect with the running layer of the secondary road.

According to the three-dimensional urban road system capable of intensively utilizing land and avoiding traffic jam claimed by the invention, it is characterized in that: the longitudinal slope section comprises a bottom road, a parking layer and a running layer; cars smoothly enter the parking layer of the straight section through the longitudinal slope section; ramps are arranged between the corresponding parking layer and parking layer of the longitudinal slope section.

According to the three-dimensional urban road system capable of intensively utilizing land and avoiding traffic jam claimed by the invention, it is characterized in that: the bottom road of the straight section comprises: a left portion including: a 2 m wide pedestrian way, a 3 m wide bicycle lane, a 1.5 m wide bus station, a bus station and a bus way which are totally 10 m wide; a middle portion including: a green belt and opposite, parallel ramps on which cars run up and down and which connect the bottom road and the parking layer, wherein the overall width is 7 m; and a right portion including: a 8 m wide bus way, a 4.5 m wide bicycle lane, and a 4 m wide pedestrian way; the middle portion of the bottom road includes a wide green belt and opposite, parallel ramps on which cars run up and down and which connect the bottom road and the parking layer; the running layer has one one-way road including a 3.5 m wide ramp from the parking layer to the running layer and a 9 m wide car access road, and the other one-way road including a 9 m wide car access road and a 2 m wide green belt; and a 1 m wide green belt is located between two one-way roads.

According to the three-dimensional urban road system capable of intensively utilizing land and avoiding traffic jam claimed by the invention, it is characterized in that: the bottom road of the straight section comprises: a left portion including: a 3 m wide pedestrian way, a 4 m wide bicycle lane, a 2 m wide bus station, a 3 m wide bus bay, an exclusive bus way, a bus-first way and a motor way which are respectively 10.5 m wide; a middle portion including: opposite, parallel ramps on which cars can run up and down and a wide green belt, which are totally 8 m wide; a right portion including: a motor way, and bus-first way and an exclusive bus way which are respectively 10.5 m, a 3 m wide green belt, a 5 m wide bicycle road, and a 4 m wide pedestrian way; the running layer includes a 12 m wide car access road on each of the two one-way roads, and opposite, parallel 7 m wide ramps which are located between on two sides and on which cars run up and down.

According to the three-dimensional urban road system capable of intensively utilizing land and avoiding traffic jam claimed by the invention, it is characterized in that: the bottom road of the straight section comprises: a left portion including: a 3 m wide pedestrian way, a 3.5 m wide bicycle lane, a 1.5 m wide bus station or green belt, and a 7.5 m wide bus way; a middle portion including: a green belt or opposite, parallel ramps, from the bottom road to the parking layer, on which cars run up and down, totally 9 m wide; a right portion including: a 7.5 m wide bus way, a 1.5 m wide bus station or green belt, a 3.5 m wide bicycle lane and a 3 m wide pedestrian way; the parking layer has one one-way road including a 10 m wide parking road and a 3.5 m wide upward ramp rising from the bottom road and the parking layer to the running layer, or a 12.5 m wide parking road and a 1 m wide separating space, and the other one-way road including a 3.5 m wide downward ramp descending from the running layer to the parking layer and to the bottom road and a 10 m wide parking road, or a 1 m wide separating space and a 12.5 m wide parking road: meaning that in the section without the ramps, the parking layer of the straight section is two one-way roads 105, 106 separated by a 2 m wide space; the running layer has one one-way road including a 1 m wide green belt, a 9 m wide car access road and a 3.5 m wide upward ramp rising from the bottom road and the parking layer to the running layer, and the other one-way road including a 3.5 m wide ramp descending from the running layer to the parking layer and to the bottom road, a 9 m wide car access road and a 1 m wide green belt: meaning that in the section without the ramps, the parking layer of the straight section is two one-way roads 105, 106 separated by a 7 m wide space.

According to the three-dimensional urban road system capable of intensively utilizing land and avoiding traffic jam claimed by the invention, it is characterized in that: the bottom road of the straight section comprises: a left portion including: a 4 m wide pedestrian way, a 5 m wide bicycle lane, a 2.5 m wide bus station or green belt, and an exclusive bus way, a bus-first road and a motor way which are totally 10.5 m wide; a middle portion including: a green belt or opposite, parallel ramps, from the bottom road to the parking layer, on which cars can run up and down, totally 9 m wide; a right portion including: an exclusive bus way, a bus-first road and a motor way which are totally 10.5 m wide, a 2.5 m wide bus station or green belt, a 5 m wide bicycle lane and a 4 m wide pedestrian way; the parking layer are two one-way roads 105, 106 which are separated by the space or the ramps and each of which is 13 m wide; the running layer has one one-way road including a 1 m wide green belt, a 12 m wide car access road and a 3.5 m wide upward ramp connecting the bottom road, the parking layer and the running layer, and the other one-way road including a 3.5 m wide downward ramp descending from the running layer to the parking layer and the bottom road, a 12 m wide car access road and a 1 m wide green belt: meaning that in the section without the ramps, the parking layer and the running layer of the straight section are both two one-way roads 105, 106 separated by a 7 m wide space.

The invention has the following advantages: the roads are changed into three layers through improvement; the upper running layer is applicable to small cars; the middle parking layer is a transfer layer, capable of parking and connecting the ground road and the upper running layer, namely the running layer for the small cars; large vehicles run on the bottom road; large vehicles and small cars are completely shunted; thus effectively solving the problem of traffic jam. On the main urban roads, small cars run upward to the parking layer through the ramps located on the wide green belt in the centre of the ground road, and continuously run upward to the upper running layer through the ramps arranged on the parking layer, thus completing switch between the upper layer and the bottom road. Such three-dimensional road system has hidden upward and downward ramps, saving the outside connecting ramps of the traditional three-dimensional road system that occupy space and also interfere with the ground traffic when cars land on the ground. Such three-dimensional road system can be designed into a single-layer structure or a double-layer structure. In case of the double layer structure, its own parking system can be formed. As for the problem of changing the habit of entering and leaving on the right side (or on the left side) into the situation of entering and leaving on the left side (or on the right side) on the three-dimensional roads, it can be solved by properly extending the left (right) doubling road. Actually, this situation is identical with the existing roads with the main road and the auxiliary road. The invention is simply structured and easily constructed, has the functions of completely separating the public transportation and private transportation on the whole line, increasing car access roads and enhancing the traffic in multiples. If the urban road system provided by the invention can be applied to a relatively long main line or loop line, the traffic capacity can be increased in multiples. For example, a 40 m wide road can usually be provided with 6 two-way motor ways, meaning that an exclusive bus way is arranged aside every two common motor ways each side, while 10 two-way motor ways can be arranged on each side of the road provided by the invention, namely 4 two-way lanes on the ground and two motor ways on each of the two sides. The small cars have been led to the road on the upper layer, so those two roads can be set as one exclusive bus way and one bus-first way. In this way, the public traffic flow can be greatly sped up. The upper layer of the road system has a two-way six-lane running layer for small cars.

BRIEF DESCRIPTION OF THE SEVERAL VIEWS OF THE DRAWINGS

FIG. 1-1 is a schematic view of a cross profile of the straight section in FIG. 1, including the bus bay.

FIG. 1-2 is a schematic view of another transformation of the straight section in FIG. 1.

FIG. 1A-1 is a schematic view of a cross profile of the straight section in FIG. 1A, excluding the bus bay.

FIG. 2 is also a schematic view of the straight section, displaying the ramp design which can meet the running and parking demands of small cars in all directions.

FIG. 2-1 is a schematic view of a cross profile of the straight section in FIG. 2, excluding the bus bay.

FIG. 2A-1 is a schematic view of a cross profile of the straight section in FIG. 2A, excluding the bus bay.

FIG. 3-1 is a schematic view of a cross profile of the straight section in FIG. 3.

FIG. 4-1 is a schematic view of the bottom road, displaying the 40 m wide ground road layout, excluding the bus bay.

FIG. 4-2 is a schematic view of the bottom road, displaying the over 50 m wide ground road layout, excluding the bus bay.

FIG. 6-1 is a also schematic view of the full intercommunication and intersection of the small cars on the main road and the secondary road in four directions.

FIG. 7-1 is also a schematic view of the full intercommunication and intersection of the small cars on two main roads.

FIG. 8-1 is also a schematic view of the intersection of the small cars at the T road of such road.

DETAILED DESCRIPTION OF THE INVENTION

Figure 1:
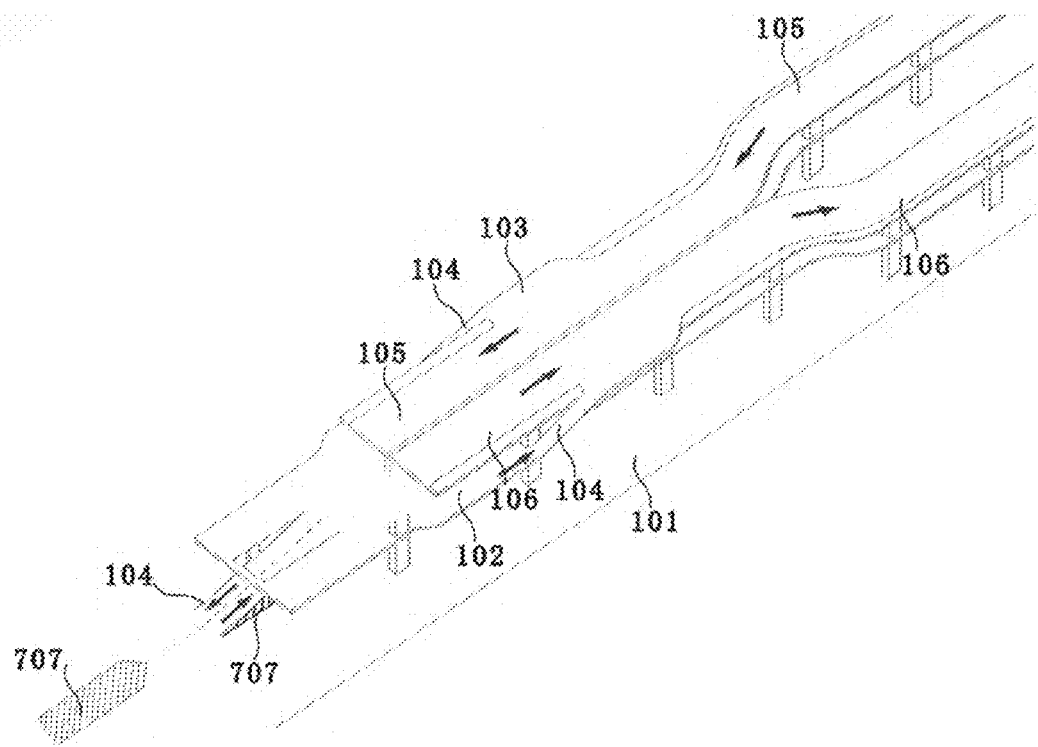
FIG. 1 is a schematic view of the straight section.
Figure 1:
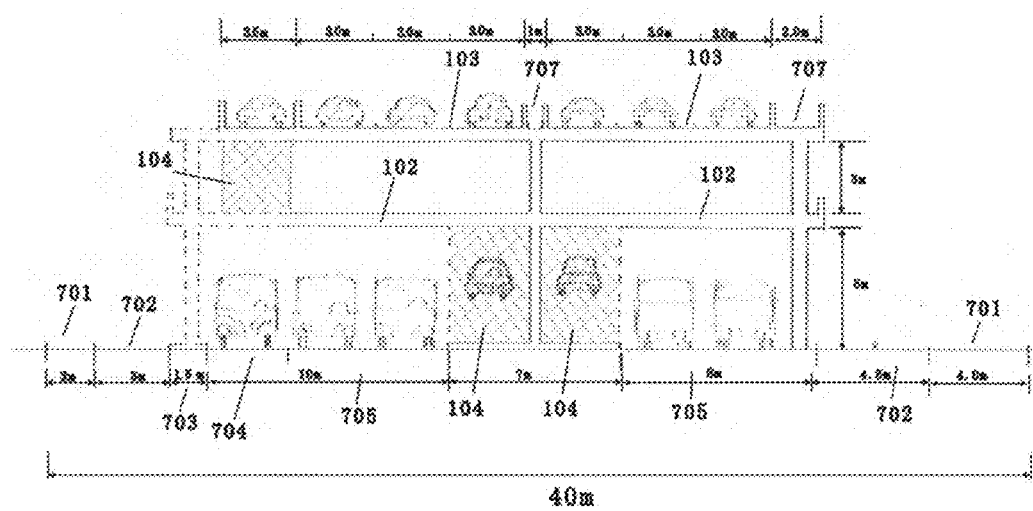

The invention is described in further detail with reference to the attached drawings.

To overcome defects of the existing roads, the invention provides a three-dimensional urban road system capable of intensively utilizing land and avoiding traffic jam, which comprises a straight section, a longitudinal slope section and an intersection. The straight section and the intersection are connected to form a road network. The longitudinal slope section is connected with the straight section, realizing connection between the straight section and the ground. The straight section comprises a bottom road 101, a parking layer 102 and a running layer 103. Ramps (104) on which small cars run up and down are arranged between the centre of the bottom road 101 and the parking layer 102 and between the parking layer 102 and the running layer 103 such that cars in the straight section conveniently switch from the bottom road 101 to the parking layer 102 and stop on the parking layer 102, or switch from the parking layer 102 to the running layer 103 and run thereon, or switch from the running layer 103 to the parking layer 102 and stops thereon, or switch from the parking layer 102 to the bottom road 101 and run away. In the invention, the bottom road 101 is mainly applicable to large vehicles such as buses, large motor vehicles (here motor vehicles refer to other vehicles except city buses, like coaches), etc., wherein the parking layer 102 and the running layer 103 are applied to small vehicles, for example: only vehicles with height below 2.3 m and mass below 3.5 t are allowed to enter the parking 102 and the running layer 103 from the bottom ramps 104. The parking layer 102 can be used for parking, thus fulfilling the aim of intensively utilizing land. Small cars stop on the parking layer 102 such that the problem of difficult parking is solved. In this way, land is intensively utilized, and also a good transfer mode is provided. Compared with construction of the "point type' large parking and transfer station, such 'linear" or "annular" parking and transfer station is more flexible and practical and better for traffic dispersion. The parking layer 102 and the running layer 103 respectively comprise one-way roads 105, 106 on which cars run oppositely. The one-way roads 105, 106 are spaced when no ramps 104 are arranged there-between. The ramps 104 are arranged on the outer sides or inner sides of the one-way roads 105, 106. As shown in FIG. 1, FIG. 1A, FIG. 2, FIG. 2A, and FIG. 3, the most important is that the bottom road also comprises a wide central green belt 707 aiming at supplying land for the ramps 104 through which small cars switch from the bottom road 101 to the parking layer 102.

Figure 5:
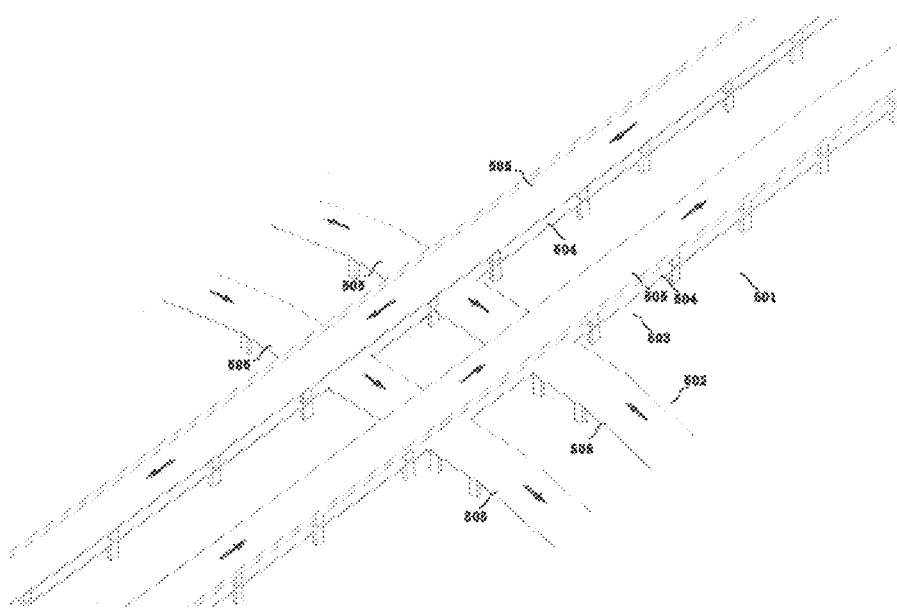
FIG. 5 is a schematic view of straight intersection of small cars on the main road and the secondary road in four directions.
Figure 6:
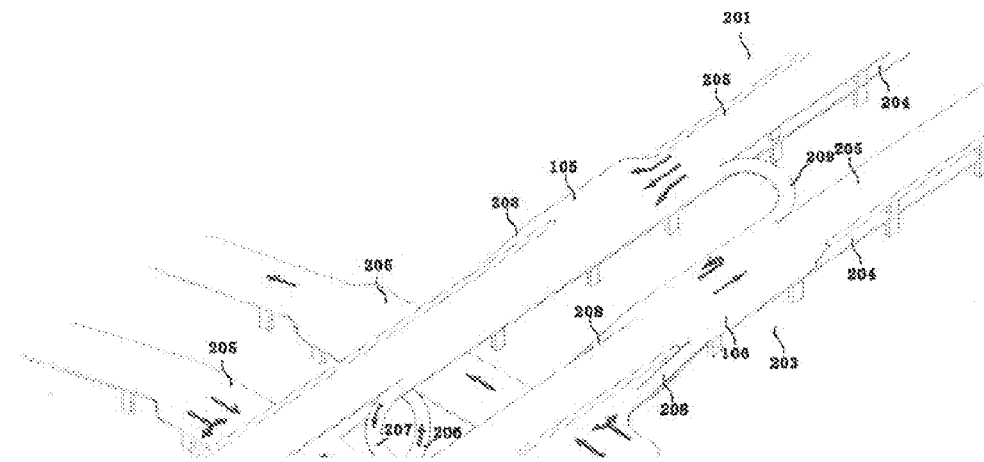
FIG. 6 is a schematic view of the full intercommunication and intersection of the small cars on the main road and the secondary road in four directions.
Figures 1, 6:
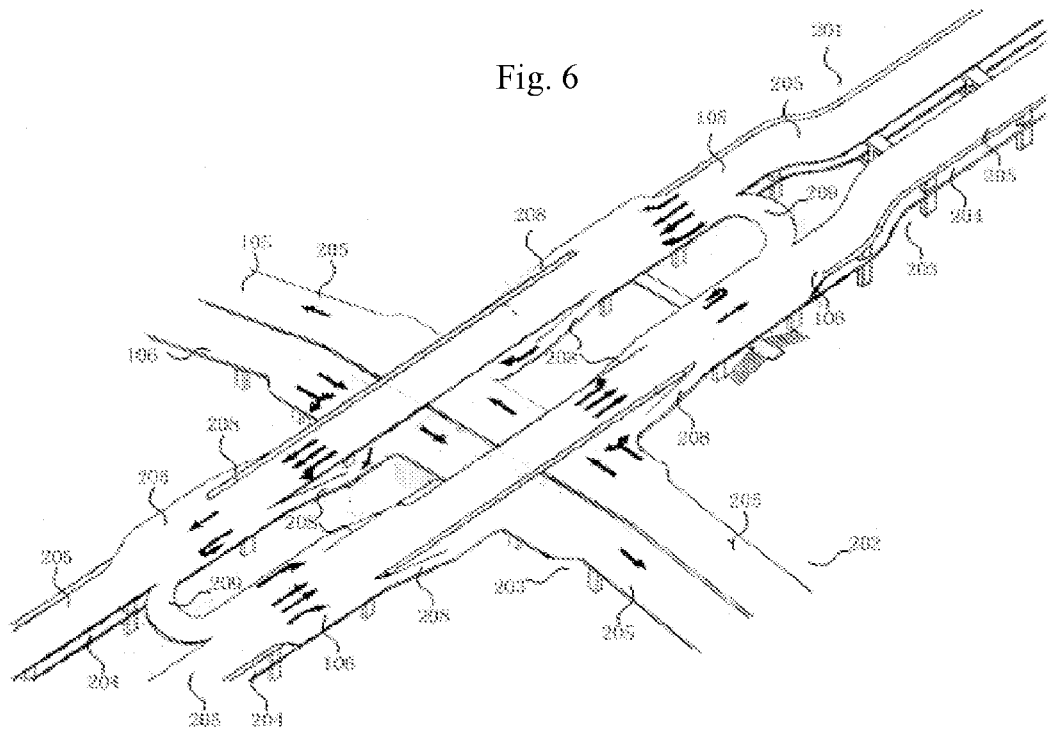
Figure 7:
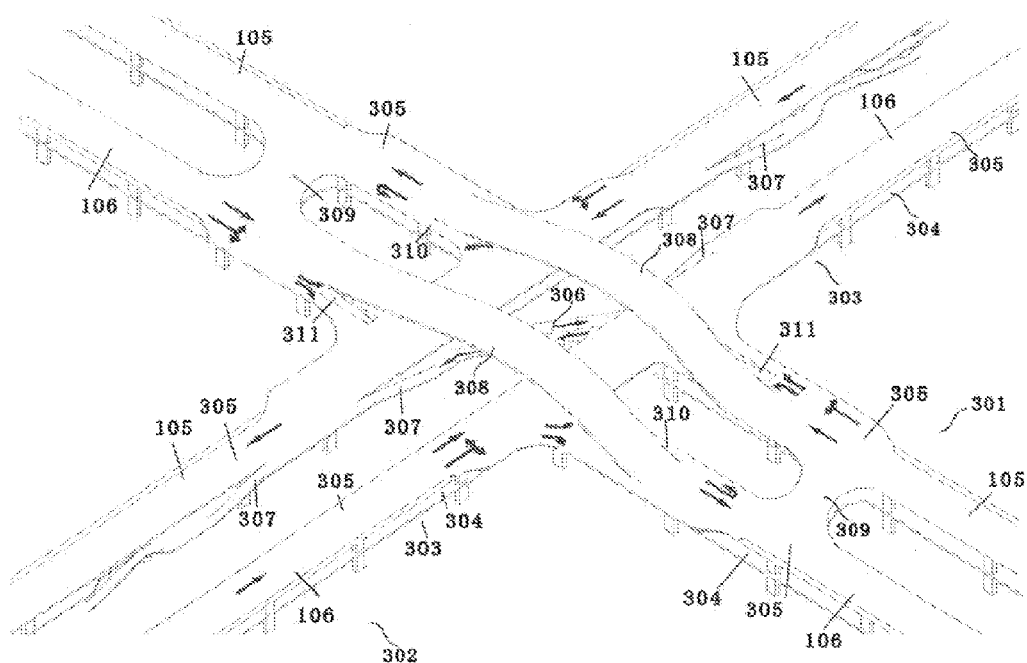
FIG. 7 is a schematic view of the full intercommunication and intersection of the small cars on such two main roads.
Figures 1, 7:
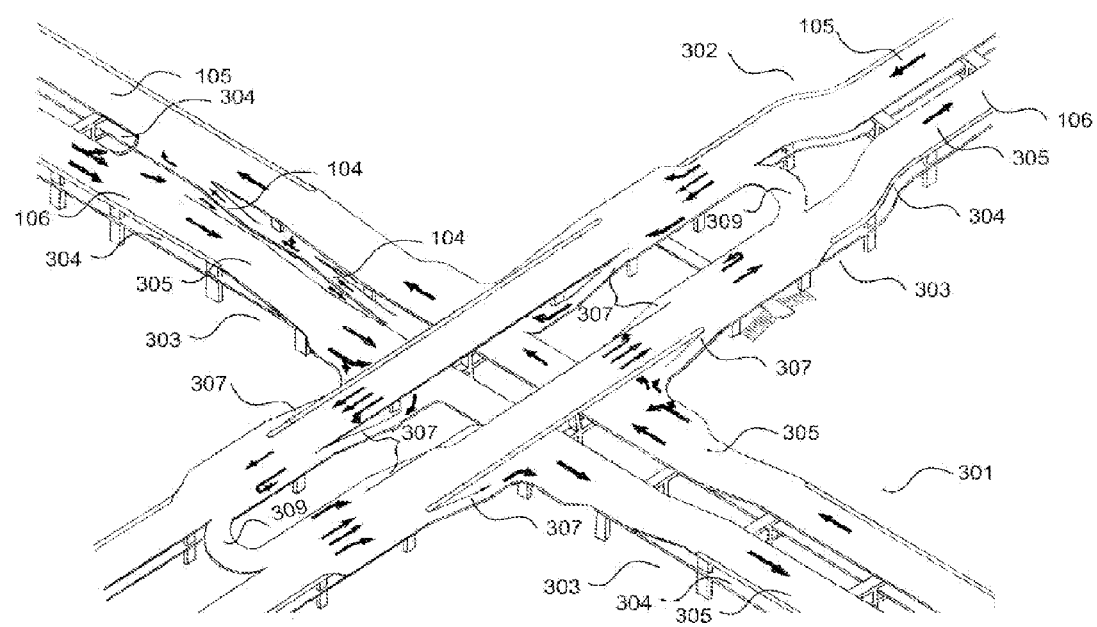
Figure 8:
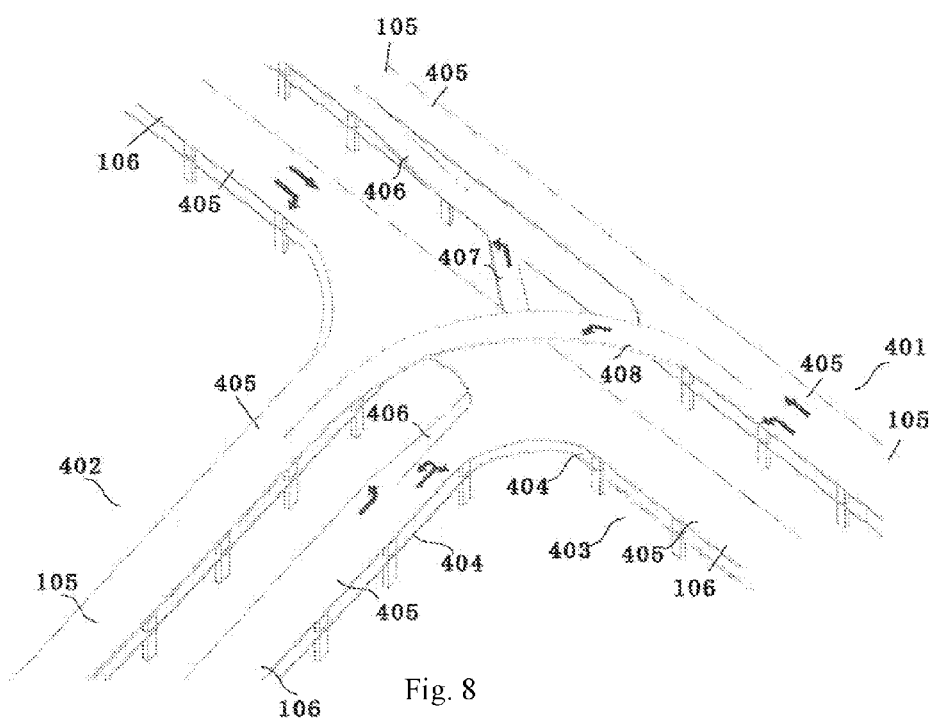
FIG. 8 is a schematic view of the intersection of the small cars at the T road of such road.
Figures 1, 8:
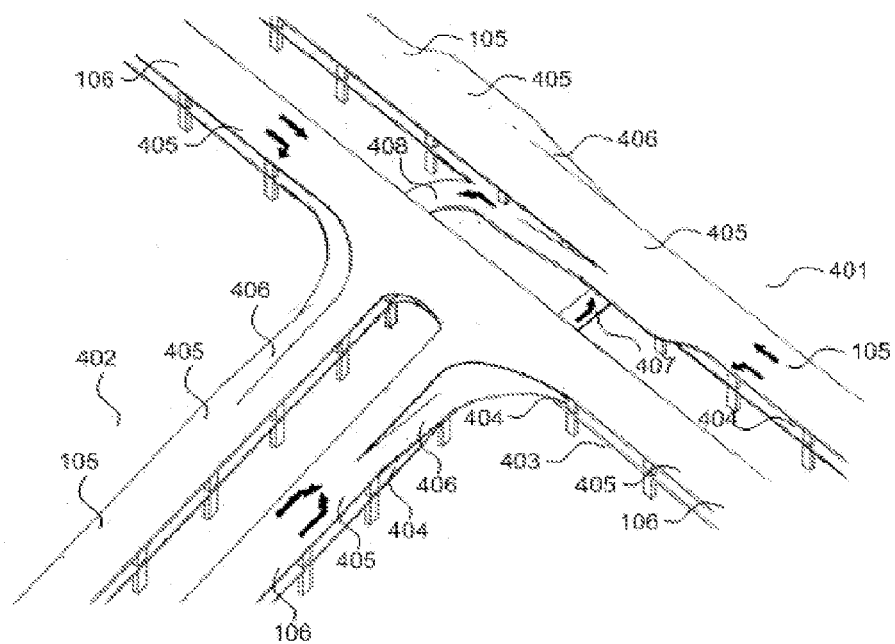

Wherein, the straight section and the intersection are connected to form a road network. The intersection is represented in the following ways: (1) the main roads 201 and the secondary road 202 form a full intercommunicating and intersecting structure, as shown in FIG. 6 and FIG. 6-1; (2) the transverse main roads 301 and the vertical main road 302 form a full intercommunicating and intersecting structure, as shown in FIG. 7 and FIG. 7-1; (3) the transverse roads 401 and the vertical road 402 form an intersecting T road structure, as shown in FIG. 8 and FIG. 8-1; (4) the main roads 501 and the second road 502 form a four-direction straight intersecting structure, as shown in FIG. 5, Thus, those four types of intersections all can be connected with the straight section to form the road network. Wherein, the main road 201, the transverse main road 301, the vertical main road 302, the transverse road 401, the vertical road 402 and the main road 501 all can be directly connected with the straight section. Wherein, those intersections can also be connected mutually to form the road network.

As shown in FIG. 6 and FIG. 6-1, the main road 201 and the secondary road 202 form a full intercommunicating and intersecting structure. The main road 201 comprises a bottom road 203, a parking layer 204 and a running layer 205, respectively connected with the bottom road 101, the parking layer 102 and the running layer 103 in the straight section. The secondary road 202 comprises a bottom road 203 and a running layer 205. Wherein, the parking layer 204 of the main road 201 and the running layer 205 of the secondary road 202 realize full intercommunication and intersection, so that cars can make a turn thereon. The parking layer 204 and the running layer 205 of the main road 201 may be separated one-way roads with a proper space there-between. The separated one-way roads are connected through connecting roads 209. Cars can smoothly make a turn through the separated space. The two connecting roads 209 form two symmetric semi-rings. In such circumstances, the running layer 205 of the main road 201 and the running layer 205 of the secondary road 202 are connected in two ways: (1) As shown in FIG. 6, the running layer 205 of the main road 201 are connected to the running layer 205 of the secondary road 202 through approach bridges 206, 207, realizing step-down connection. Cars can switch from the running layer 205 of the main road 201 to the running layer 205 of the secondary road 202. Requirements for space refer to the above. The running layer 205 of the secondary road 202 is connected with the running layer 205 of the main road 201 through approach roads 208 such that cars conveniently switch from the running layer 205 of the secondary road 202 to the running layer 205 of the main road 201. (2) As shown in FIG. 6-1, the running layer 205 of the secondary road 202 is two one-way roads connected in parallel; the running layer 205 of the main road 201 is connected with the running layer 205 of the secondary road 202 through a total of weight approach roads 208 which are respectively located on two sides of the one-way roads 105, 106, and then cars switch between the running layer 205 of the main road 201 and the running layer 205 of the secondary road 202, realizing the full intercommunicating and intersecting structure. The two structures are mainly different in that the main road 201 turns towards the left of the secondary road 202. In FIG. 6, the main road is connected to the secondary road through approach bridges 206, 207, completing the left turn from the main road to the secondary road; it is advantaged in convenient driving, but disadvantaged in that a proper space accommodating the descending approach bridges 206, 207 must be reserved between the two one-way roads of the main road 201, and the space increases. In FIG. 6-1, cars on the one-way road 105 of the running layer 205 of the main road 201 run through the cross road, turn around through the connecting road 209, run downward to the running layer 205 of the secondary 202 through the approach road 208 on the inner side of the one-way road 106 and then turn right, thus realizing the left turn on the one-way road 105 of the main road 201; left turn on the one-way road 106 is likewise: cars run through the cross road, turn around through the connecting road 209, run downward to the running layer 205 of the secondary road 202 through the approach road 208 on the inner side of the one-way road 105, and then turn right, thus realizing the left turn on the one-way road 106 of the main road 201. Left turn on the one-way road 105 of the running layer 205 of the secondary 202 is as follows: cars turn right through the approach road 208 on the inner side of the one-way road 106 of the main roads 201 to run on the running layer 205 of the main road 201, and turn around through the connecting road 209, thus realizing the left turn on the one-way road 105 of the secondary road 202; the left turn on the one-way road 106 of the running layer 205 of the secondary road 202 is as follows: cars turn right through the approach road 208 on the inner side of the one-way road 105 of the main road 201 to run on the running layer 205 of the main road 201, and then turn round through the connecting road 209, thus realizing the left turn on the one-way road 106 of the secondary road 202. It is advantaged in no need of reserving the accommodating approach bridges 206, 207 in the middle of the main road 201. The approach bridges which form an increasing descending space are not needed, thus saving the urban space at the cross road.

Wherein, the transverse main road 301 and the vertical main road 302 form a full intercommunicating and intersecting structure. As shown in FIG. 7 and FIG. 7-1, the transverse main road 301 and the vertical main road 302 respectively comprise a bottom road 303, a parking layer 304 and a running layer 305; the transverse main road 301 and the vertical main road 302 are respectively connected with the straight section; the parking layer 304 of the transverse main road 301 is connected through approach bridges 306; the approach bridges 306 are respectively connected with two downward square hole approach roads 311 of the transverse main road 301 and the two upward approach roads 307 of the vertical main road 302 such that cars switch from the transverse main road 301 to the vertical main road 302 and run on the later; projections on the one-way roads of the running layer 305 of the transverse main road 301 are connected to form an arch bridge 308 across the vertical main road 302; the one-way roads on the parking layer 304 and the running layer 305 of the transverse main road 301 are respectively connected through connecting roads 309. The transverse arch bridge 308 is double width type. To turn left on the one-way road of the vertical main road 302, cars shall turn right 90°, run on the section 310 on the one-way road of the transverse main road 301 to the connecting road 309, turn 180° to the arch bridge 308, and turn upward, thus realizing the left turn on the vertical main road 302. In another form, as shown in FIG. 7-1, the transverse main road 301 and the vertical main road 302 respectively comprise a bottom road 303, a parking layer 304 and a running layer 305, respectively connected with the bottom road 101, the parking layer 102 and the running layer 103 of the straight section; the parking layer 304 of the transverse main road 301 that is connected with the straight section is terminated at the cross road; the parking layer 304 and the running layer 305 of the vertical main road 302 and the running layer 305 of the transverse main road 301 realize full intercommunication and intersection; both the transverse main road 301 and the vertical main road 302 are two spaced one-way roads 105, 106, wherein the corresponding one-way roads 105, 106 of the running layer 305 on the vertical main road 302 are connected through connecting roads 309 which form two symmetric semi-rings; the corresponding one-way roads 105, 106 of the running layer 305 on the vertical main road 302 are also connected with the running layer 305 of the transverse main road 301 through approach roads 307 on two sides such that cars switch between the running layer 305 of the vertical main road 302 and the running layer 305 of the transverse main road 301 and make a turn, thus realizing a full intercommunicating and intersecting structure. Left turn on the transverse main road 301 and the vertical main road 302 are identical with the mode as shown in FIG. 6-1. The specific process is as follows: to turn left on the one-way road 105 of the running layer 305 of the vertical main road 302, cars run through the cross road, turn around through the connecting road 309, turn downward on the approach road 307 on the inner side of the one-way road 106 to the running layer 305 of the transverse main road 301 and turn right, thus realizing the left turn on the one-way road 105 of the vertical main road 302; to turn left on the one-way road 106, cars run through the cross road, turn round through the connecting road 309, run downward on the approach road 307 on the inner side of the one-way road 105 to the running layer 305 of the transverse main road 301 and turn right, thus realizing the left turn on the one-way road 106 of the vertical main road 302; to turn left on the one-way road 105 of the running layer 305 of the transverse main road 301, cars turn right through the approach road 307 on the inner side of the one-way road 106 of the vertical main road 302, run upward to the running layer 305 of the vertical main road 302 and then turn round through the connecting road 309, thus realizing left turn on the one-way road 105 of the transverse main road 301; to turn left on the one-way road 106 of the running layer 305 of the transverse main road 301, cars turn right through the approach road 307 on the inner side of the one-way road 105 of the vertical main road 302, run upward to the running layer 305 of the vertical main road 302 and then turn round through the connecting road 309, thus realizing the left turn on the one-way road 106 of the transverse main road 301. It is advantaged in no need of building the arch bridge 308 which increase the building height on the transverse main road 301, saving the urban space at the cross road and beautifying road.

The intersecting T-road structure formed by the transverse road 401 and the vertical road 402 can be seen in FIG. 8 and FIG. 8-1. The transverse road 401 and the vertical road 402 respectively comprise a bottom road 403, a parking layer 404 and a running layer 405; the running layer 405 of the vertical road 402 is connected with an approach bridge 407 through an approach road 406 and led to the parking layer 404 of the transverse road 401 through the approach bridge 407; and the parking layer 404 of the transverse road 401 is connected with the running layer 405 of the transverse road 401 through another approach road 406. Left turn from the transverse road 401 to the vertical road 402 can be achieved in two ways: (1) As shown in FIG. 8, the running layer 405 of the transverse road 401 is connected with the running layer 405 of the vertical main road 402 through another approach bridge 408, and the approach bridge 408 crosses the transverse road 401 on one side, required to be built alone and increasing height. (2) As shown in FIG. 8-1, the running layer 405 of the transverse road 401 is connected with the transverse road 401 and the parking layer 404 of the vertical road 402 through a downward approach bridge 408; the parking layer 404 of the vertical road 402 is upward connected with the running layer 405 of the vertical road 402 through a third approach bridge 406; complete left turn is achieved through the transverse road 401 and the parking layer 404 of the vertical road 402, good for road construction.

The four-direction straight intersecting structure formed by the main road 501 and the secondary road 502 can be seen in FIG. 5. The main road 501 comprises a bottom road 503, a parking layer 504 and a running layer 505; the secondary road 502 comprises a bottom road 503 and a running layer 505, wherein the parking layer 504 of the main road 501 is connected with the running layer 505 of the secondary road 502, forming staggered intersection.

The longitudinal slope section is connected with the straight section, forming a start transition belt between such three-dimensional road and the ground. The longitudinal slope section comprises a bottom road 601, a parking layer 602 and a running layer 603, connecting with the bottom road 101, the parking layer 102 and the running layer 103 of the straight section. Wherein, ramps 104 are arranged between the corresponding bottom road 601 and the parking layer 602 of the longitudinal slope section.

As shown in FIG. 1-1, the bottom road 101 of the straight section comprises: a left portion including: from the inside to the outside, a bus way 705, a bus station 704, a bus station 703, a bicycle lane 702 and a pedestrian way 701; a right portion including: from the inside to the outside, another bus way 705, a bicycle lane 702 and a pedestrian 701; and a middle portion including: a green belt 707 and ramps 104 which connect the bottom road 101 and the parking layer and on which small cars run up and down. Specially, the bottom road is as follows: the left portion: a 2 m wide pedestrian way 701, a 3 m wide bicycle lane 702, a 1.5 m wide bus station 703, a bus station 704 and a bus way 705 which are totally 10 m wide; the middle portion: a green belt 707 and ramps (104) which connect the bottom road and the parking layer on which small cars run up and down, wherein the overall width is 7 m; and the right portion including: a 8 m wide bus way 705, a 4.5 m wide bicycle lane 702, and a 4 m wide pedestrian way 701. In this way, the overall width is 40 m, applicable to layout of general urban main roads. As shown in FIG. 1-1, the running layer 103 has one one-way road including 3.5 m wide upward and downward ramp 104 from the parking layer 102 to the running layer 103 and a 9 m wide car access road, and the other one-way road including a 9 m wide car access road, a 2 m wide green belt 707, and a 1 m wide green belt 707 is arranged between two one-way roads. If the running layer 103 and the parking layer 102 need the upward or downward ramp 104, the road layout with the ramp on one side is formed. At the section without need of the upward or downward ramp, the road layout without the ramp is formed.

Figures 1, 2:
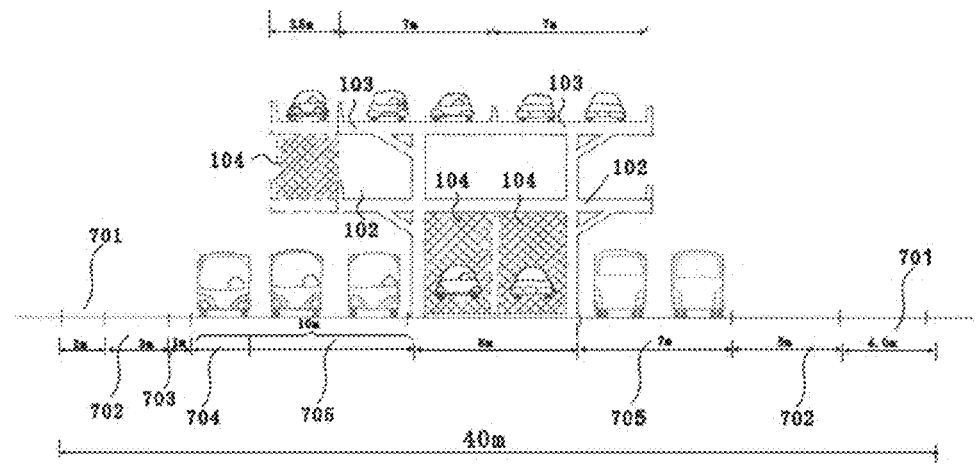
Figure 1A:
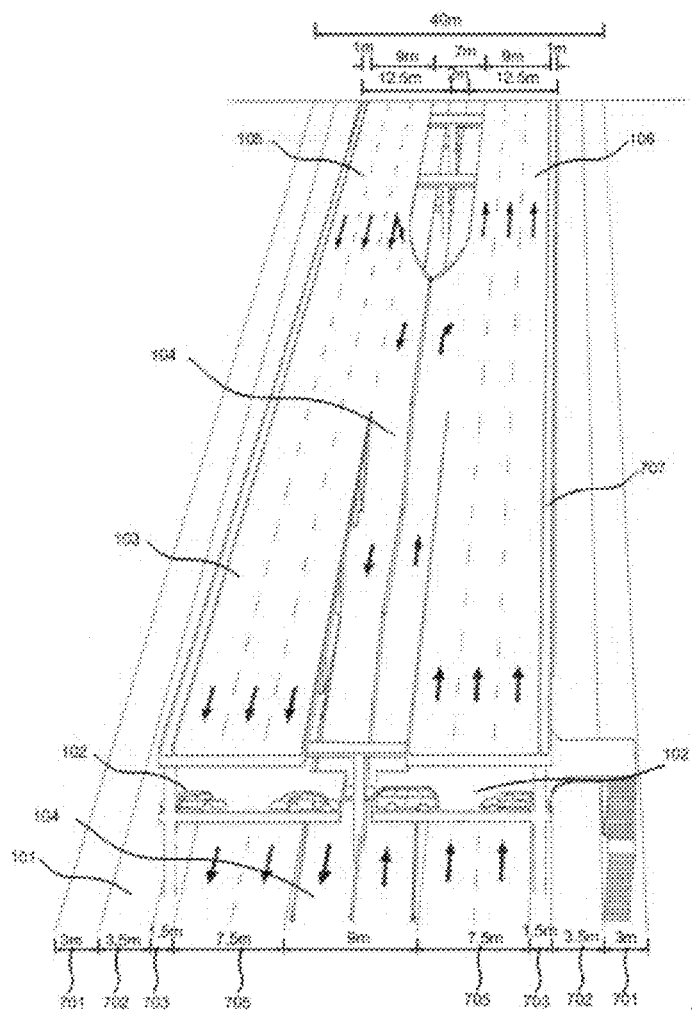
FIG. 1A is also a schematic view of the straight section, displaying the 40 m wide straight section and the hidden upward and downward ramps.
Figures 1, 1A:
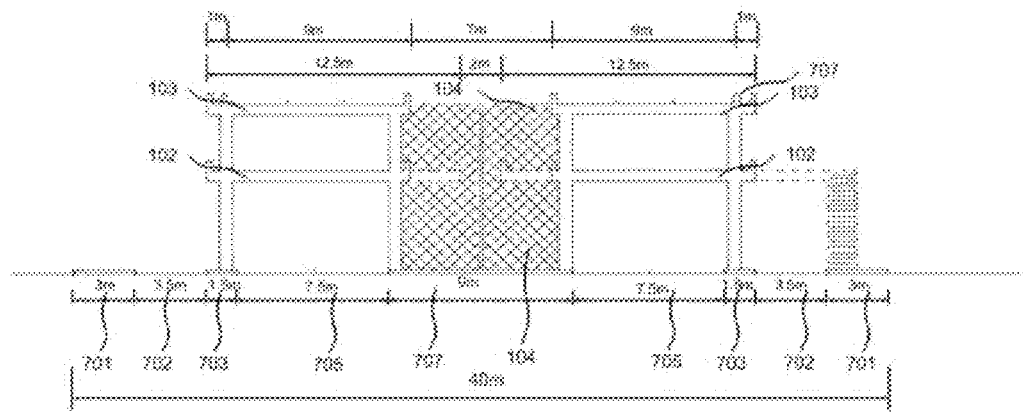

As shown in FIG. 1A and FIG. 1A-1, the bottom road 101 of the straight section comprises: a left portion including: a 3 m wide pedestrian way 701, a 3.5 m wide bicycle lane 702, a 1.5 m wide bus station 703 or green belt 707, and a 7.5 m wide bus way 705; a middle portion including: a green belt 707 or opposite, parallel ramps 104 which connect the bottom road and the parking layer and of which cars run and down, wherein the overall width is 9 m; and a right portion including: a 7.5 m wide bus way 705, a 1.5 m wide bus station 703 or green belt 707, a 3.5 m wide bicycle lane 702 and a 3 m wide pedestrian way 701. In such circumstances, the bottom road 101 is not provided with a bus bay, but employs the straight-through type bus station. At positions with the bus station, the wide green belt 707 of the middle portion retracts at a distance of 3.5 m to form a temporary road, meaning that the bus station 703 and the ramp 104 cannot be located at the same cross section position. The parking layer 102 has one one-way road including a 10 m wide parking road and a 3.5 m wide upward ramp 104 rising from the bottom road 101, via the parking layer 102, to the running layer 103, or a 12.5 m wide parking road and a 1 m wide separating space, and the other one-way road including a 3.5 m wide downward ramp 104 descending from the running layer 103 to the parking layer 102 and to the bottom road 101 and a 10 m wide parking road, or a 1 m wide separating space and a 12.5 m wide parking road. At the position without the ramp 104, two parking roads are respectively reduced by 10 m, reserving spaces for two 3.5 m ramps 104. At sections without the ramp 104, the two parking roads are respectively 12.5 m wide, reserving a 2 m separating space there-between so as to make a full use of the space. The running layer 103 has one one-way road including a 1 m wide green belt 707, a 9 m wide car access road and a 3.5 m wide ramp 104 rising from the parking layer 102 to the running layer 103, and the other one-way road including a 3.5 m wide ramp 104 sending from the running layer 103 to the parking layer 102, a 9 m wide car access road and a 1 m wide green belt 707, meaning that the two one-way roads without the ramp 104 are separated by a 7 m space.

Figure 4:
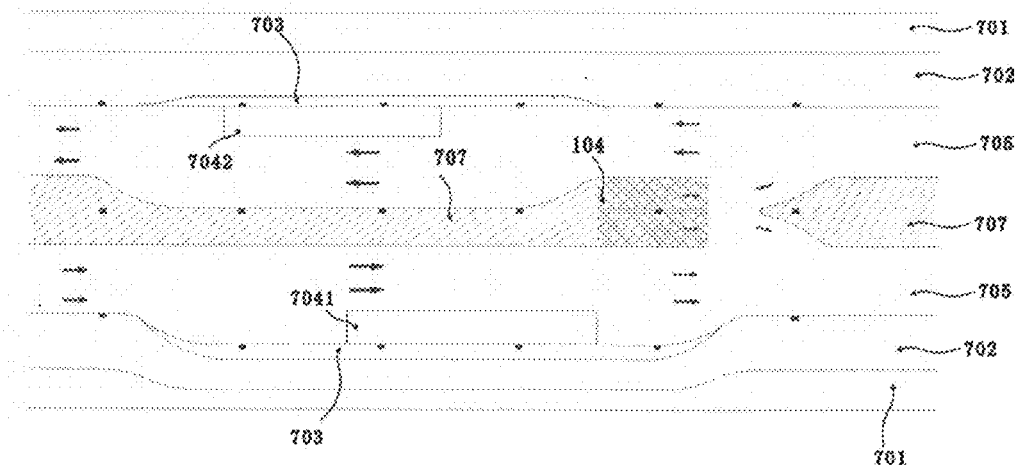
FIG. 4 is a schematic view of the bottom road, displaying the 40 m wide ground road layout, including the bus bay.
Figures 1, 4:
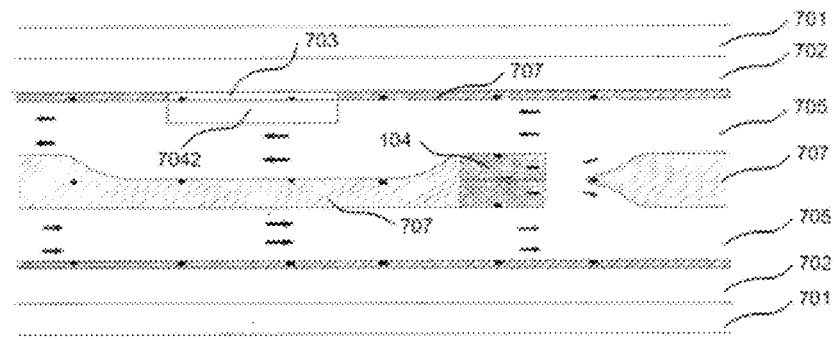
Figures 2, 4:
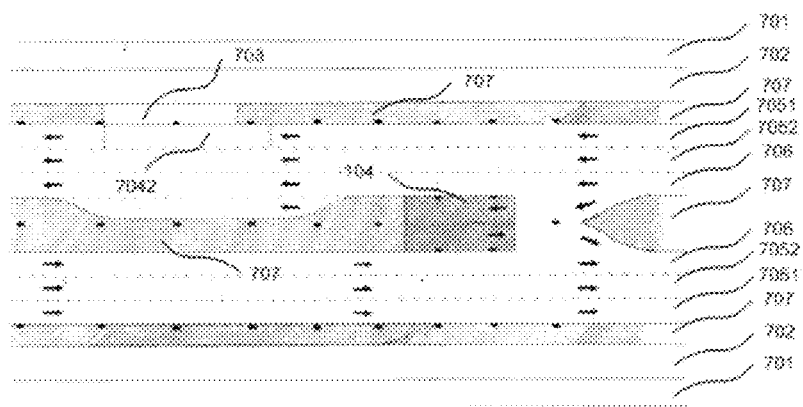

As shown in FIG. 2-1, the bottom road 101 of the straight section comprises a left portion provided with a pedestrian road 701, a bicycle lane 702, a bus station 703, a bus bay 7041 (the bus bay 7041 refers to the part projecting from the middle to the outside, as shown in FIG. 4), an exclusive bus way 7051, a bus-first way 7052 and a motor way 706 (the motor way 706 refers to the way for vehicles except the bus); a middle portion provided with ramps 104 which connect the bottom road and the parking layer and on which cars run and down and a green belt 707; and a right portion provided another motor way 706, bus-first way 7052, exclusive bus way 7051, green belt 707, bicycle lane 702 and pedestrian way 701. The bottom road 101 of the straight section is specifically as follows: left portion: a 3 m wide pedestrian 701, a 4 m wide bicycle lane 702, a 2 m wide bus station 703, a 3 m wide bus bay 7041, and an exclusive bus way 7051, a bus-first way 7052 and a motor way 706 which are totally 10.5 m wide; the middle portion: ramps 104 on which small cars run up and down and a green belt 707, wherein the total width is 8 m; the right portion: a motor way 706, a bus-first way 7052 and an exclusive bus way 7051 which are totally 10.5 m wide, a 3 m wide green belt 707, a 5 m wide bicycle lane 702 and a 4 m wide pedestrian way 701. In such circumstances, the total coverage is 53 m wide, applicable to layout of over 50 m wide roads. As shown in FIG. 2-1, the running layer 103 has two one-way roads which respectively include a 12 m wide car access road, 7 m wide opposite, parallel upward and downward ramps 104 which are located between the two one-way roads and directly connect the parking layer 102 and the bottom road 101.

Figure 2:
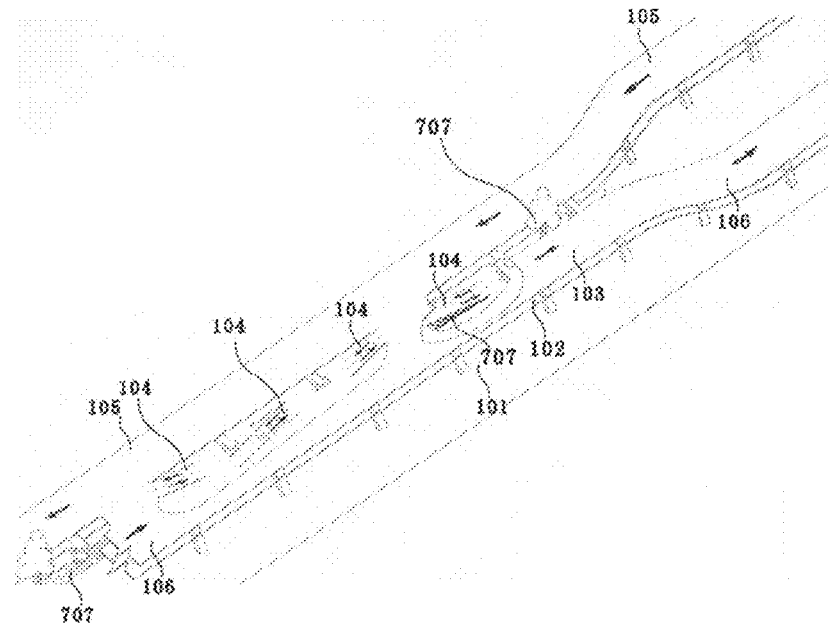
Figures 1, 2:
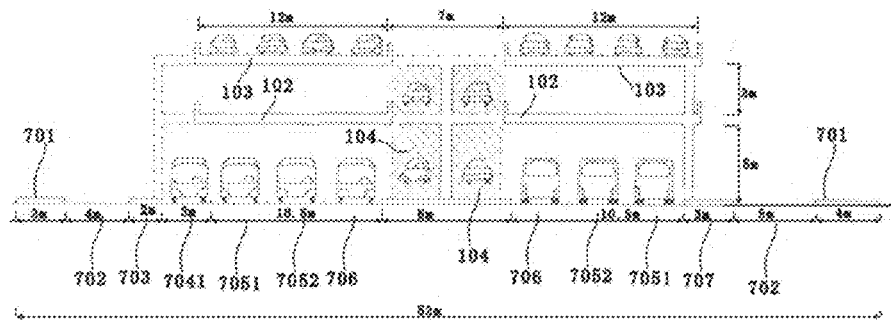
Figures 1, 2A:
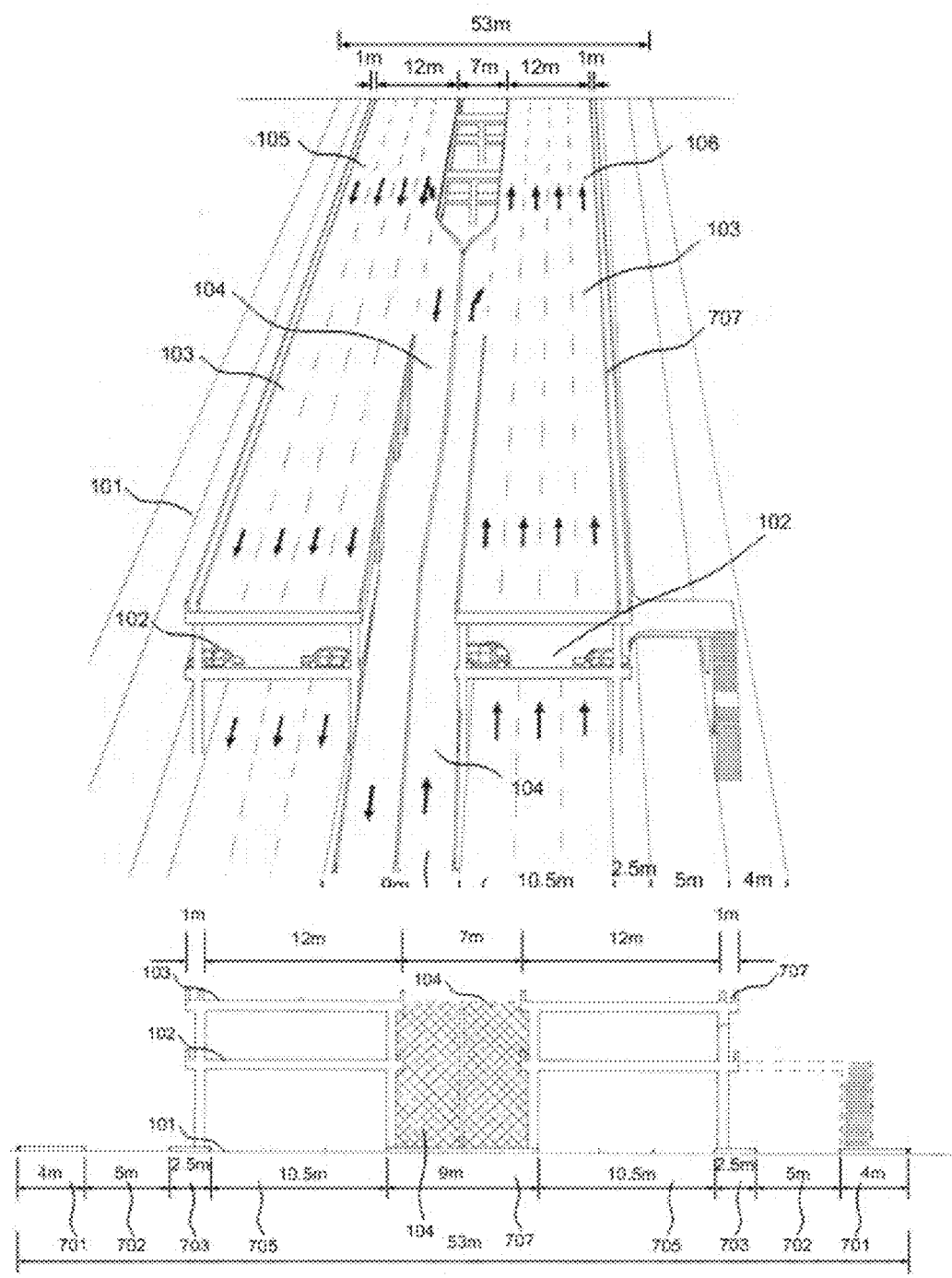
FIG. 2A is also a schematic view of the straight section, displaying the over 50 m wide straight section and the hidden upward and downward ramps.

As shown in FIG. 2A and FIG. 2A-1, the bottom road 101 of the straight section comprises a left portion including: a 4 m wide pedestrian way 701, a 5 m wide bicycle lane 702, a 2.5 m wide bus station 703 or green belt 707, and an exclusive bus way 7051, a bus-first road 7052 and a motor way 706 which are totally 10.5 m wide; a middle portion including: a green belt 707 or opposite, parallel ramps 104 which connect the bottom road and the parking layer and on which cars run up and down, totally 9 m wide; a right portion including: an exclusive bus way 7051, a bus-first road 7052 and a motor way 706 which are totally 10.5 m wide, a 2.5 m wide bus station 703 or green belt 707, a 5 m wide bicycle lane 702 and a 4 m wide pedestrian way 701; the parking layer 102 are two parking roads which are separated by the space or the ramps in the middle and each of which is 13 m wide; the running layer 103 has one one-way road including a 1 m wide green belt 707, a 12 m wide car access road and a 3.5 m wide upward ramp 104 which connect the bottom road 101 and the parking layer 102 with the running layer 103, and another one-way road including a 3.5 m wide downward ramp 104 descending from the running layer 103 to the parking layer 102 and the bottom road 101, a 12 m wide car access road and a 1 m wide green belt 707, meaning that the parking layer 102 and the running layer 103 are both two one-way roads 105, 106 separated by the 7 m wide space at sections without the upward and downward ramps.

The wide green belt 707 of the bottom road 101 is generally set as 7 m-9 m according to the landform. On the two sides, 2 or 3 two-way motor ways, totally 4 or 6 motor ways, are respectively arranged upon the 40 m or over 50 m road width (mainly used to meet demands on public transportation). A green belt, a bicycle lane and a pedestrian way are arranged on each of the two sides of the motor ways. This is the ground layout of such main urban traffic roads. Of course, other forms can be designed according to the specific road width.

As shown in FIG. 4, FIG. 4-1 and FIG. 4-2, the bus stations on the bottom road 101 of the straight section can be arranged in two modes, namely bus bay 7041 and straight-through-type bus station 7042, also applicable to situations as shown in FIG. 1, FIG. 1A, FIG. 2, FIG. 2A and FIG. 3. The bus stations on the bottom road 101 of the straight section are set as the bus bays 7041, forming the layout as shown on the left of the FIG. 1-1 and FIG. 2-1; if the bus stations on the bottom road 101 of the straight section are set as the straight-through-type bus stations 7042, forming the layout as shown on the right of the FIG. 1-1 and the FIG. 2-1 and FIG. 1A-1 and FIG. 2A-1, meaning that the bus stations on the two sides of the bottom road 101 can be set as any one of the two types.

At the three-dimensional road portion: upward and downward small car ramps 104 (vehicles higher than 2.3 m and heavier than 3.5 t are prohibited to run on the ramps) are arranged in parallel on the wide green belt in the centre of the ground road to reach the parking layer 102 of the three-dimensional road. The parking layer 102 is a transfer layer with a parking function, pedestrian overcrossing function, and can contact with the road on the ground and the above running layer 103, namely the running layer of the small cars. On common 40 m wide main urban roads, small cars run upward from the ramps 104 arranged on the wide green belt in the centre of the road on the ground to the parking layer, and then switch between the parking layer and the above running layer through the ramps 104 arranged on two sides of the parking layer, as shown in FIGS. 1, 1-1 and 1-2; or in a more convenient way, as shown in FIGS. 1A and 1A-1. The road layout as shown in FIGS. 1, 1-1, 1-2, 1A and 1A-1 are applicable to 40 m wide urban roads.

On wider main urban roads, small cars can more conveniently and directly transfer from the bottom road 101 to the running layer 103 of the three-dimensional road, namely between the running layers for the small cars, and the bicycle lane and the pedestrian way on the ground road are wider. The small cars can directly run upward to the running layer via the parking layer 102 through the ramps 104 arranged on the wide green belt in the centre of the ground road; vice versa. The road layout as shown in FIGS. 1A, 1A-1, 2, 2-1, 2A, 2A-1, 2, 2-1, 2A and 2A-1 are applicable to over 50 m wide main urban roads. Wherein, the small car ramps 104 as shown in FIG. 2 are a kind of combined ramps, advantaged in being capable of meeting the running and parking demands of small cars in all directions. Such ramp arrangement is also applicable to cases as shown in FIGS. 1, 1A and 2A. Meanwhile, those ramps may be combined in rows in an opposite or reverse way, or arranged alone or as a single unit according to demands.

Figure 3:
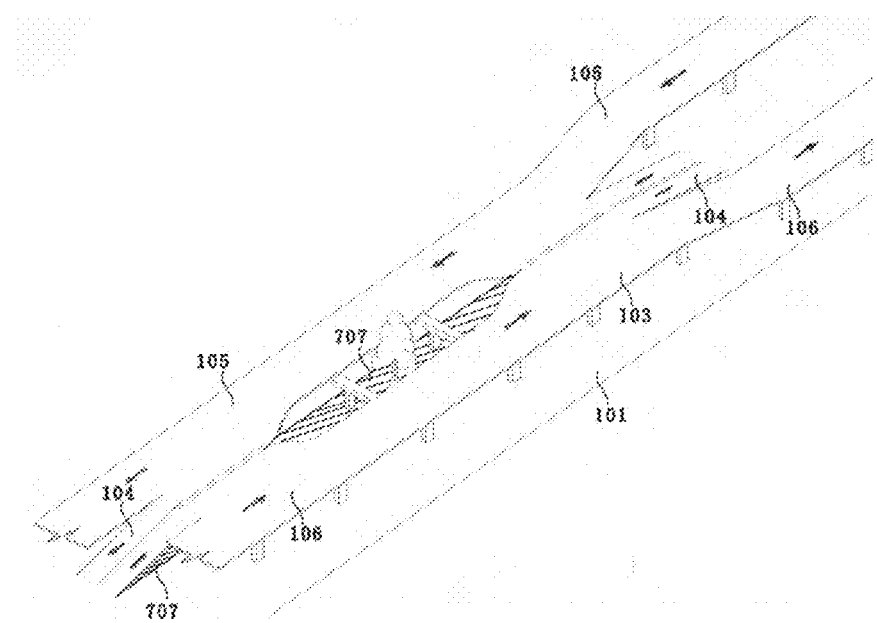
FIG. 3 is a structural view of the one-layer straight section.
Figures 1, 3:
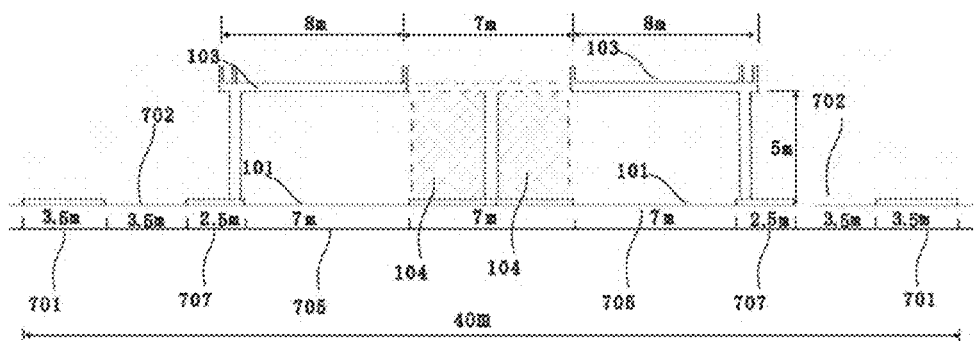

FIGS. 3 and 3-1 display a single-layer structural view of such road. The height that the cars directly raise from the bottom road 101 to the running layer 103 through the ramp 104 can be set as 5 m. The ramp 104 located between the two one-way roads is 7 m wide. The bottom road 101 can be specifically arranged in the following way (bus stations on the two sides are set as the straight-through-type bus stations 7042): left portion including a 3.5 m wide pedestrian way 701, a 3.5 m wide bicycle lane 702, a 2.5 m wide green belt 707, and an overall 7 m wide bus way 705; a middle portion including a green belt 707 and ramps 104 which extend upward from the bottom road 101 to the running layer 103 and on which small cars run up and down, wherein the overall width is 7 m; a right portion including a 7 m wide bus way 705, a 2.5 m wide green belt 707, a 3.5 m wide bicycle lane 702 and a 3.5 m wide pedestrian way 701. In this situation, the overall width is 40 m. The running layer 103 includes 7 m wide upward and downward ramps 104 rising from the bottom layer 101 to the running layer 103 and the 8 m wide car access roads of the one-way roads on two sides. It is advantaged in simplicity and low construction cost, has the functions of completely separating the public transportation and private transportation on the whole line, increasing car access roads and enhancing the traffic in multiples.

FIGS. 5, 6, 6-1, 7, 7-1, 8 and 8-1 show several modes of such main urban road at the cross road. FIG. 5 shows the straight intersection mode of small cars on the main road and the secondary road in four directions; FIG. 6 and FIG. 6-1 show the full intercommunication and intersection mode of small cars on the main road and the secondary road in four directions; FIG. 7 and FIG. 7-1 show the full intercommunication and intersection mode of small cars on such two main roads; and FIG. 8 and FIG. 8-1 show two intersection modes of the small cards at such T cross of such road.

The ground road of such three-dimensional road system is separated in the middle at middle and small cross roads not allowing left turn of the buses and straight running of the buses on the transverse road (like the existing measures); on the ground roads of the three-dimensional road system that have large and middle-sized cross roads with intercommunicating overpasses, small cars are not allowed to turn left or right. Or, it is regulated that small cars are forbidden to run through three (inclusive) consecutive crosses on the ground road of such road system. Thus, the running space for the public traffic is "purified" to the maximum extent, ensuring smoothness of the ground road (public traffic) of such three-dimensional road system along the line and all intersecting points along the line. Small cars only temporarily occupy the ground road when driving into or away such road system. As long as this concept is well executed, even if the upper layer of the three-dimensional road system gets saturated and cars slow down along with continuous increase (this is positive) of the small cars, quick and accurate public transit system is available on the ground road, while the "linear" or "annular" parking layer between those two independent roads can conduct the dispersion, parking and transfer functions at proper time. if things continue this way, more people are led to select the public traffic consciously when going out, thus keeping good overall traffic in a dynamic balance state. When such road conducts dispersion and guide at nodes, the ground road and the two running layers of the three-dimensional road system both increase corresponding net turning road pavement instead of sacrificing the space of the straight road to increase of space for the turning road. Even compared with the traditional road nodes, the occupied road space still is far less, and more flexible; the pedestrian way and the bicycle lane will be wider. Moreover, if such road structure can be implemented, it can provide over 1,000 units of parking space per kilometer without occupying extra road space. Such parking "platform" also functions as the overhead crossing, getting twofold results with half the effort. Therefore, it is reasonable that it can avoid traffic jam.

Figure 9:
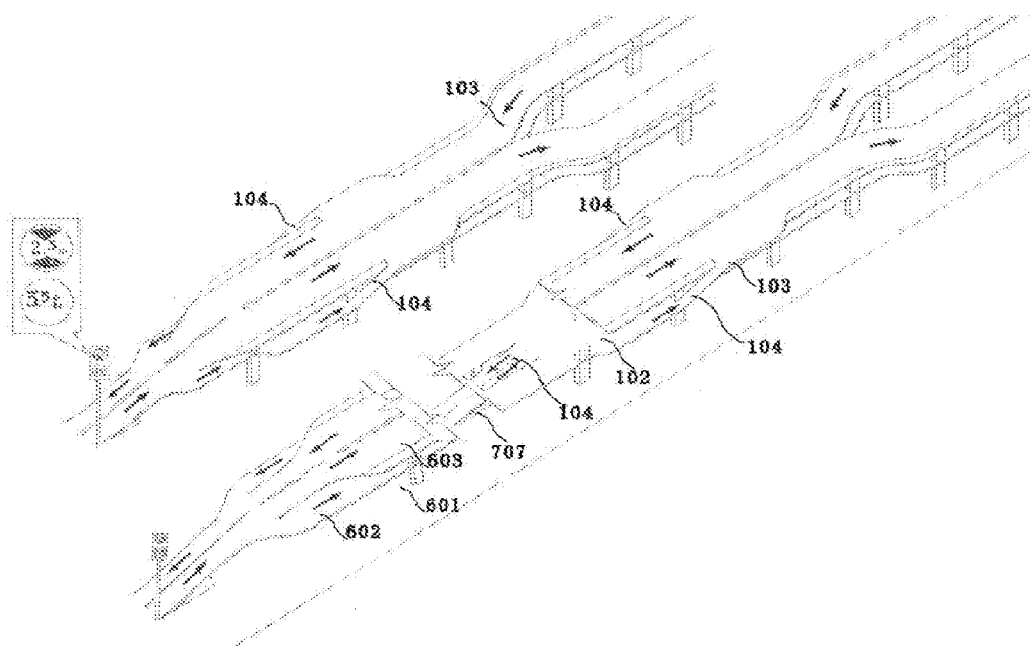
FIG. 9 is a schematic view of the longitudinal slope section.

Generally, if a cross overpass or an intercommunicating overpass is built on a 40 m wide road, a longitudinal slope section which is over 100 m long will be formed at the approach bridge. Providing that the longitudinal slope is designed as a four two-way lanes, it is usually 16-17 m wide. On conditions that many main urban roads are only 40 m wide, it is difficult to set two motor ways (specially the bus ways) on the two sides of this longitudinal slope section without occupying the bicycle lane and the pedestrian way on each side. So, the over 100 m long ground road usually becomes a congested point. According to such urban three-dimensional road system which separates the large vehicles and the small cars, the longitudinal two-direction four-lane is only 13-14 m wide, saving 3 m. In this way, the bicycle lane and the pedestrian way are not affected after two motor ways are respectively arranged on two sides. See the two structures as shown in FIG. 9. Such road system can also provide a certain amount of parking space (such as the parking layer at the longitudinal slope section). When the structure as shown in FIG. 9 is used alone, it is a double-width cross overpass used to solve the traffic jam at a single node; when needed, it can be easily modified into various intercommunicating overpass as shown in FIGS. 5, 6, 6-1, 7 and 7-1, occupying far less land. When the situation further changes, those overpasses can be connected with the straight section of such three-dimensional road system to form a road network, without major changes. This means such three-dimensional road system can also be constructed at phases and stages. A three-dimensional road system across one cross road or across varieties of neighbor cross roads can be built in the front stage, equivalent to integrating the existing multiple cross overpasses. In the later stage, when the traffic flow at this cross road or those varieties of cross roads further increases, those cross roads can be easily modified in ways of direct intersection, full intercommunication and intersection, intersection between two main roads, etc. without changing the main structure of the built part, thus avoiding the phenomenon of "pushing over and reconstruction" and also overcoming the difficulty of huge investment at one time.

If the urban road system provided by the invention can be applied to a relatively long main line or loop line, the traffic capacity can be increased in multiples. For example, a 40 m wide road can usually be provided with 6 two-way motor ways, meaning that an exclusive bus way is arranged aside every two common motor ways each side, while 10 two-way motor ways can be arranged on each side of the road provided by the invention, namely 4 two-way motor ways on the ground and two motor ways on each of the two sides. The small cars have been led to the road on the upper layer, so those two roads can be set as one exclusive bus way and one bus-first way. In this way, the public traffic flow can be greatly sped up. Meanwhile, the three-dimensional road system also has 6 motor ways for small cars and a parking layer between the ground road and the upper small car running layer, thus relieving the predicament of difficult parking in the city.

Furthermore, if such road system forms a network in a city, the smooth, accurate and convenient public transit without interference from the small cars on the ground road will be certain to become the first choice when people go out; the three-dimensional road system have small car running roads without bigger capacities and without the traffic lights. Such optimum traffic mode is reliable when applied to solve the problem of traffic jams in cities.

What is claimed is:
1. A three-dimensional urban road system, comprising:
a straight section;
a longitudinal slope section; and
an intersection, wherein:
the straight section and the intersection are connected to form a road network,
the longitudinal slope section is connected with the straight section and the longitudinal slope section is connected with the intersection to realize initial connection among the straight section, the intersection and the ground,
the straight section comprises a bottom road, a parking layer and a running layer, two-way, parallel upward and downward ramps on which cars run up and down are arranged between the center of the bottom road and the parking layer and between the parking layer and the running layer such that cars in the straight section can switch from the bottom road to the parking layer and stop on the parking layer or switch from the parking layer to the running layer and run thereon, thus shunting and parking cars in such three-dimensional road system,
the upward and downward ramps for cars are arranged on and connected to, in parallel, a wide green belt reserved in the center of the bottom road,
according to the relative width of the road and the actual demands, the reserved central green belt is approximately 7-9 m wide, the bottom road of the straight section comprises:
  a left portion including: a pedestrian way, a bicycle lane, a bus station or a green belt, an exclusive bus way, a bus-first way and a motor way;
  a middle portion including: a green belt or opposite, parallel ramps on which cars can run up and down and which start from the bottom road to the parking layer; and
  a right portion including: an exclusive bus way, a bus-first way, a motor way, a bus station or a green belt, a bicycle lane and a pedestrian way;
the parking layer are two one-way roads which are separated by the space or the ramps;
the running layer has one one-way road including a green belt, a car access road and an upward ramp rising from the bottom road to the parking layer and further to the running layer, and the other one-way road including a downward ramp descending from the running layer to the parking layer and further to the bottom road, a car access road and a green belt;
the longitudinal slope section comprises a bottom road, a parking layer and a running layer; cars smoothly enter the parking layer of the straight section through the longitudinal slope section;
ramps are arranged between the corresponding bottom road and parking layer of the longitudinal slope section;
the longitudinal slope section realizes connection of the initial segments of the three-dimension road system, or is applied to the initial segments of various independent overpasses except an underpass.

2. The three-dimensional urban road system capable of intensively utilizing land and avoiding traffic jam according to claim 1, wherein:
  the intersection comprises a full intercommunicating and intersecting structure formed by a main road and a secondary road;
    the main road comprises a bottom road, a parking layer and a running layer, respectively communicating with the bottom road, the parking layer and the running layer in the straight section;
    the secondary road comprises a bottom road and a running layer,
  wherein the parking layer and the running layer of the main road and the running layer of the secondary road realize full intercommunication and intersection,
  the parking layer and the running layer of the main road are two separated one-way roads, wherein the one-way roads corresponding to the running layer of the main road are connected through connecting roads, and the two connecting roads form two symmetric semi-rings,
  the running layer in the main road is connected to the running layer of the secondary road through approach bridges to realize step-down connection, so that cars switch from the running layer of the main road to the running layer of the secondary road to make a turn,
  the running layer in the secondary road is connected with the running layer of the main road through the approach bridge such that cars switch from the running layer of the secondary road to the running layer of the main road, realizing mutual switch and turn between the running layer of the main road and the running layer of the secondary road.

3. The three-dimensional urban road system capable of intensively utilizing land and avoiding traffic jam according to claim 1, wherein the intersection comprises a full intercommunicating and intersecting structure formed by a main road and one or more secondary roads;
  the main road comprises a bottom road, a parking layer and a running layer, respectively communicating with the bottom road, the parking layer and the running layer in the straight section;
  each secondary road comprises a bottom road and a running layer, wherein the parking layer and the running layer of the main road and the running layer of the secondary road realize full intercommunication and intersection;
  the parking layer and the running layer of the main road are two separated one-way roads, wherein the one-way roads corresponding to the running layer of the main road are connected through connecting roads, and the two connecting roads form two symmetric semi-rings;
  the running layer of the secondary road is two one-way roads connected in parallel;
  the running layer of the main road is connected with the running layer of the secondary road through approach bridges which are respectively located on two sides of the one-way roads of the main road, realizing mutual switch between the running layer of the main road and the running layer of the secondary road and forming a full intercommunicating and intersecting structure.

4. The three-dimensional urban road system capable of intensively utilizing land and avoiding traffic jam according to claim 1, wherein the intersection comprises a full intercommunicating and intersecting structure formed by a transverse main road and a vertical main road;
  the transverse main road and the vertical main road respectively comprise a bottom road, a parking layer and a running layer;
  the bottom roads, the parking layers and the running layers of the transverse main road and the vertical main road are respectively connected with the bottom road, the parking layer and the running layer of the straight section;
  the parking layer of the transverse main road is connected through approach bridges; the approach bridges are respectively connected with two downward square hole approach roads of the transverse main road and the two upward approach roads of the vertical main road such that cars switch from the transverse main road to the vertical main road and run on the later;
  projections on the one-way roads of the running layer of the transverse main road are connected to form an arch bridge across the vertical main road; the one-way roads on the parking layer and the running layer of the transverse main road are respectively connected through connecting roads; and
  the running layer of the transverse main road and the running layer of the vertical main road are connected through connecting road.

5. The three-dimensional urban road system capable of intensively utilizing land and avoiding traffic jam according to claim 1, wherein the intersection comprises a full intercommunicating structure formed by a transverse main road and a vertical main road;
  the transverse main road and the vertical main road respectively comprise a bottom road, a parking layer and a running layer, respectively connected with the bottom road, the parking layer and the running layer of the above straight section, the parking layer of the transverse main road that is connected with the straight section is terminated at the cross road;
  the parking layer and the running layer of the vertical main road and the running layer of the transverse main road realize full intercommunication and intersection;

both the transverse main road and the vertical main road are two spaced one-way roads, wherein the corresponding one-way roads of the running layer on the vertical main road are connected through connecting roads which form two symmetric semi-rings;

the corresponding one-way roads of the running layer on the vertical main road are also connected with the running layer of the transverse main road through approach roads on two sides such that cars switch between the running layer of the vertical main road and the running layer of the transverse main road and make a turn, thus realizing a full intercommunicating and intersecting structure.

6. The three-dimensional urban road system capable of intensively utilizing land and avoiding traffic jam according to claim 1, wherein the intersection comprise an intersecting T road formed by a transverse road and a vertical road;

the transverse road and the vertical road respectively comprise a bottom road, a parking layer and a running layer; the running layer of the vertical road is connected with an approach bridge through an approach road and led to the parking layer of the transverse road through the approach bridge;

the parking layer of the transverse road is connected with the running layer of the transverse road through another approach road; and the running layer of the transverse road is connected with the running layer of the vertical road through another approach bridge.

7. The three-dimensional urban road system capable of intensively utilizing land and avoiding traffic jam according to claim 1, wherein the intersection comprises an intersecting T road formed by a transverse road and a vertical road;

the transverse road and the vertical road respectively comprise a bottom road, a parking layer and a running layer; the running layer of the vertical road is downward connected with an approach bridge through an approach road on the outside and led to the parking layer of the transverse road through the approach bridge;

the parking layer of the transverse road is upward connected with the running layer of the transverse road through another approach road on the outside;

the running layer of the transverse road is downward connected to the parking layers of the transverse main road and the vertical main road through another approach road on the inner side;

the parking layer of the vertical road is upward connected with the running layer of the vertical road through a third approach road.

8. The three-dimensional urban road system capable of intensively utilizing land and avoiding traffic jam according to claim 1, wherein the intersection comprises a four-direction straight intersecting structure formed by a main road and a secondary road;

the main road comprises a bottom road, a parking layer and a running layer;

the secondary road comprises a bottom road and a running layer, wherein the parking layer of the main road intercommunicate and intersect with the running layer of the secondary road.

9. The three-dimensional urban road system capable of intensively utilizing land and avoiding traffic jam according to claim 1, wherein the bottom road of the straight section comprises:

a left portion including: a 4 m wide pedestrian way, a 5 m wide bicycle lane, a 2.5 m wide bus station or green belt, and an exclusive bus way, a bus-first road and a motor way which are totally 10.5 m wide;

a middle portion including: a green belt or opposite, parallel ramps which connect the bottom road and the parking layer and on which cars can run up and down, totally 9 m wide;

a right portion including: an exclusive bus way, a bus-first road and a motor way which are totally 10.5 m wide, a 2.5 m wide bus station or green belt, a 5 m wide bicycle lane and a 4 m wide pedestrian way;

the parking layer are two one-way roads which are separated by the space or the ramps and each of which is 13 m wide;

the running layer has one one-way road including a 1 m wide green belt, a 12 m wide car access road and a 3.5 m wide upward ramp which connect the bottom road and the parking layer with the running layer, and the other one-way road including a 3.5 m wide downward ramp descending from the running layer to the parking layer and the bottom road, a 12 m wide car access road and a 1 m wide green belt.

10. A three-dimensional urban road system, comprising:
a straight section;
a longitudinal slope section; and
an intersection, wherein the straight section and the intersection are connected to form a road network, the longitudinal slope section is connected with the straight section and the longitudinal slope section is connected with the intersection to realize initial connection among the straight section, the intersection and the ground, the straight section comprises a bottom road, a parking layer and a running layer, two-way, parallel upward and downward ramps on which cars run up and down, respectively, are arranged between the center of the bottom road and the parking layer and between the parking layer and the running layer such that cars in the straight section can switch from the bottom road to the parking layer and stop on the parking layer or switch from the parking layer to the running layer and run thereon, thus shunting and parking cars in such three-dimensional road system, the upward and downward ramps for cars are arranged on and connected to, in parallel, a wide green belt reserved in the center of the bottom road, according to the relative width of the road and the actual demands, the reserved central green belt is approximately 7-9 m wide;

the bottom road of the straight section comprises:
a left portion including: a pedestrian way, a bicycle lane, a bus station, a bus station and a bus way;
a middle portion including: a green belt and opposite, parallel ramps on which cars can run up and down and which start from the bottom road to the parking layer; and
a right portion including: a bus way, a bicycle lane and a pedestrian way, wherein the middle portion of the bottom road has a wide green belt and opposite, parallel ramps which rise from the bottom road to the parking layer and on which cars can run up and down, the running layer has one one-way road including a ramp rising from the parking layer to the running layer and a car access road, and the other one-way road including a car access road and a green belt located between the two one-way roads, the longitudinal slope section comprises a bottom road, a parking layer and a running layer, cars smoothly enter the parking layer of the straight section through the longitudinal slope section; ramps are arranged between the corresponding bottom road and parking layer of the longitudinal slope section; the longitudinal slope section realizes connection of the initial segments of the three-dimension road system, or is applied to the initial segments of various independent overpasses except an underpass.

11. The three-dimensional urban road system capable of intensively utilizing land and avoiding traffic jam according to claim 10, wherein the bottom road of the straight section comprises:
a left portion including: a 2 m wide pedestrian way, a 3 m wide bicycle lane, a 1.5 m wide bus station, a bus station and a bus way which are totally 10 m wide;
a middle portion including: a green belt and opposite, parallel ramps on which cars run up and down and which connect the bottom road and the parking layer, wherein the overall width is 7 m; and
a right portion including: a 8 m wide bus way, a 4.5 m wide bicycle lane, and a 4 m wide pedestrian way,
the middle portion of the bottom road includes a wide green belt and opposite, parallel ramps on which cars run up and down and which connect the bottom road and the parking layer;
the running layer has one one-way road including a 3.5 m wide ramp from the parking layer to the running layer and a 9 m wide car access road, and the other one-way road including a 9 m wide car access road and a 2 m wide green belt; and
a 1 m wide green belt is located between two one-way roads.

12. A three-dimensional urban road system, comprising:
a straight section;
a longitudinal slope section; and
an intersection,
wherein the straight section and the intersection are connected to form a road network,
the longitudinal slope section is connected with the straight section and the longitudinal slope section is connected with the intersection to realize initial connection among the straight section, the intersection and the ground,
the straight section comprises a bottom road, a parking layer and a running layer,
two-way, parallel upward and downward ramps on which cars run up and down are arranged between the center of the bottom road and the parking layer and between the parking layer and the running layer such that cars in the straight section can switch from the bottom road to the parking layer and stop on the parking layer or switch from the parking layer to the running layer and run thereon, thus shunting and parking cars in such three-dimensional road system,
the upward and downward ramps for cars are arranged on and connected to, in parallel, a wide green belt reserved in the center of the bottom road; according to the relative width of the road and the actual demands, the reserved central green belt is approximately 7-9 m wide;
the bottom road of the straight section comprises:
a left portion including: a pedestrian way, a bicycle lane, a bus station, a bus bay, an exclusive bus way, a bus-first way and a motor way;
a middle portion including: opposite, parallel ramps which are connected in parallel and on which cars can run up and down and a wide green belt; and
a right portion including: a motor way, a bus-first way, an exclusive bus way, a wide green belt, a bicycle lane and a pedestrian way,
the running layer has two one-way roads which respectively include car access roads and opposite, parallel ramps which are located between the car access roads on two sides and connected in parallel and on which cars can run up and down,
the parking layer has two one-way roads which respectively include parking roads and opposite, parallel ramps which are located between the parking roads on two sides and are connected in parallel,
the longitudinal slope section comprises a bottom road, a parking layer and a running layer,
cars smoothly enter the parking layer of the straight section through the longitudinal slope section,
ramps are arranged between the corresponding bottom road and parking layer of the longitudinal slope section,
the longitudinal slope section realizes connection of the initial segments of the three-dimension road system, or is applied to the initial segments of various independent overpasses except an underpass.

13. The three-dimensional urban road system capable of intensively utilizing land and avoiding traffic jam according to claim 12, wherein the bottom road of the straight section comprises:
a left portion including: a 3 m wide pedestrian way, a 4 m wide bicycle lane, a 2 m wide bus station, a 3 m wide bus bay, an exclusive bus way, a bus-first way and a motor way which are respectively 10.5 m wide;
a middle portion including: opposite, parallel ramps on which cars can run up and down and a wide green belt, which are totally 8 m wide;
a right portion including: a motor way, and bus-first way and an exclusive bus way which are respectively 10.5 m, a 3 m wide green belt, a 5 m wide bicycle road, and a 4 m wide pedestrian way;
the running layer includes a 12 m wide car access road on each of the two one-way roads, and opposite, parallel 7 m wide ramps which are located between on two sides and on which cars run up and down.

14. A three-dimensional urban road system, comprising:
a straight section;
a longitudinal slope section; and
an intersection, wherein
the straight section and the intersection are connected to form a road network,
the longitudinal slope section is connected with the straight section and the longitudinal slope section is connected with the intersection to realize initial connection among the straight section, the intersection and the ground,
the straight section comprises a bottom road, a parking layer and a running layer,
two-way, parallel upward and downward ramps on which cars run up and down are arranged between the center of the bottom road and the parking layer and between the parking layer and the running layer such that cars in the straight section can switch from the bottom road to the parking layer and stop on the parking layer or switch from the parking layer to the running layer and run thereon, thus shunting and parking cars in such three-dimensional road system, the upward and downward ramps for cars are arranged on and connected to, in parallel, a wide green belt reserved in the center of the bottom road, according to the relative width of the road and the actual demands, the reserved central green belt is usually 7-9 m wide, the bottom road of the straight section comprises:
- a left portion including: a pedestrian way, a bicycle lane, a bus station or a green belt and a road way;
- a middle portion including: a green belt and opposite, parallel ramps which start from the bottom road to the parking layer and on which cars can run up and down; and
- a right portion including: a bus way, a bus station or a wide green belt, a bicycle lane and a pedestrian way, the parking layer has one one-way road including a parking road and a ramp rising from the bottom road to the parking layer and further to the running layer or a parking road and a separating space, and the other one-way road including a ramp descending from the running layer to the parking layer and further to the bottom road and a parking road, or a separating space and a parking road, the running layer has one one-way road including a green belt, a car access road and a ramp rising from the bottom road to the parking layer and further to the running layer, and the other one-way road including a ramp descending from the parking layer to the parking layer and further to the bottom road, a car access road and a green belt, the longitudinal slope section comprises a bottom road, a parking layer and a running layer, cars smoothly enter the parking layer of the straight section through the longitudinal slope section, ramps are arranged between the corresponding bottom road and parking layer of the longitudinal slope section, the longitudinal slope section realizes connection of the initial segments of the three-dimension road system, or is applied to the initial segments of various independent overpasses except an underpass.

15. The three-dimensional urban road system capable of intensively utilizing land and avoiding traffic jam according to claim 14, wherein the bottom road of the straight section comprises:
- a left portion including: a 3 m wide pedestrian way, a 3.5 m wide bicycle lane, a 1.5 m wide bus station or green belt, and a 7.5 m wide bus way;
- a middle portion including: a green belt or opposite, parallel ramps which connect the bottom road and the parking layer and on which cars can run up and down, totally 9 m wide; a right portion including: a 7.5 m wide bus way, a 1.5 m wide bus station or green belt, a 3.5 m wide bicycle lane and a 3 m wide pedestrian way;

the parking layer has one one-way road including a 10 m wide parking road and a 3.5 m wide upward ramp rising from the bottom road and the parking layer to the running layer, or a 12.5 m wide parking road and a 1 m wide separating space, and the other one-way road including a 3.5 m wide downward ramp descending from the running layer to the parking layer and to the bottom road and a 10 m wide parking road, or a 1 m wide separating space and a 12.5 m wide parking road;

the running layer has one one-way road including a 1 m wide green belt, a 9 m wide car access road and a 3.5 m wide upward ramp rising from the bottom road and the parking layer to the running layer, and the other one-way road including a 3.5 m wide ramp descending from the running layer to the parking layer and to the bottom road, a 9 m wide car access road and a 1 m wide green belt.

* * * * *